(12) United States Patent
Kranz

(10) Patent No.: US 9,387,731 B2
(45) Date of Patent: Jul. 12, 2016

(54) CENTRAL TIRE INFLATION SYSTEM PRESSURE REGULATOR

(71) Applicant: Stemco LP, Longview, TX (US)

(72) Inventor: Mark J. Kranz, Longview, TX (US)

(73) Assignee: STEMCO LP, Longview, TX (US)

( * ) Notice: Subject to any disclaimer, the term of this patent is extended or adjusted under 35 U.S.C. 154(b) by 371 days.

(21) Appl. No.: 14/030,855

(22) Filed: Sep. 18, 2013

(65) Prior Publication Data

US 2014/0076456 A1 Mar. 20, 2014

Related U.S. Application Data

(60) Provisional application No. 61/703,109, filed on Sep. 19, 2012.

(51) Int. Cl.
*B60C 23/00* (2006.01)

(52) U.S. Cl.
CPC .................................. *B60C 23/003* (2013.01)

(58) Field of Classification Search
CPC ...... B60C 23/003; B60C 23/00; B60C 23/10; B60C 29/00; F16F 15/20; F16F 15/202; F16F 15/207
USPC ......................................... 152/415, 416, 417
See application file for complete search history.

(56) References Cited

U.S. PATENT DOCUMENTS

| | | | |
|---|---|---|---|
| 2,715,430 A * | 8/1955 | Lindeman | B60C 23/003 152/416 |
| 4,583,566 A | 4/1986 | Kalavitz et al. | |
| 4,619,303 A * | 10/1986 | Bryan | B60C 23/001 137/224 |
| 4,719,940 A * | 1/1988 | Beavers | G05D 16/0663 137/505.39 |
| 4,744,399 A * | 5/1988 | Magnuson | B60C 23/003 137/102 |
| 4,765,385 A | 8/1988 | McGeachy | |
| 5,327,346 A * | 7/1994 | Goodell | B60C 23/061 152/416 |
| 6,401,743 B1 * | 6/2002 | Naedler | B60C 23/003 137/224 |
| 6,590,267 B1 * | 7/2003 | Goodwin-Johansson | B81B 3/0021 257/414 |
| 2001/0015224 A1 | 8/2001 | Freigang et al. | |
| 2003/0080862 A1 | 5/2003 | Kranz | |
| 2006/0081294 A1 * | 4/2006 | Drexel | G05D 16/0663 137/554 |
| 2006/0225790 A1 * | 10/2006 | Boyer | G05D 16/0666 137/505.34 |
| 2009/0020170 A1 | 1/2009 | Anderson et al. | |
| 2009/0096599 A1 | 4/2009 | Kranz | |
| 2010/0147387 A1 * | 6/2010 | Medley | B60C 23/003 137/1 |
| 2011/0132484 A1 | 6/2011 | Teach et al. | |

FOREIGN PATENT DOCUMENTS

WO 2011/022267 A2 2/2011

OTHER PUBLICATIONS

International Search Report and Written Opinion of International Application No. PCT/US2013/060531; Date of Mailing: Aug. 21, Extended European Search Report for European Patent Application No. 13839591.8, dated May 3, 2017. 7 pages.

* cited by examiner 2014; 9 pages.

*Primary Examiner* — Kip T Kotter
(74) *Attorney, Agent, or Firm* — Perkins Coie LLP

(57) ABSTRACT

An electronic pressure regulator is provided to regulate the pressure in one or more pneumatic tires that are selectively in fluid communication with a pressurized air source. The electronic pressure regulator may include a proportional MEMS valve that may be used to vary pressure behind a diaphragm in a method that provides a relatively fast response time and may experience relatively little wear over a relatively large number of cycles.

18 Claims, 4 Drawing Sheets

CENTRAL TIRE INFLATION SYSTEM PRESSURE REGULATOR

CROSS-REFERENCE TO RELATED APPLICATION(S)

The present application claims priority to U.S. Provisional Patent Application Ser. No. 61/703,109, filed Sep. 19, 2012, the disclosure of which is incorporated herein by reference as if set out in full.

TECHNICAL FIELD

The present disclosure relates to central tire inflation systems used to constantly maintain tire pressure of a vehicle in operation. More specifically, the disclosure provides pressure regulators used in supplying pressurized air to the tires of vehicle trailers.

BACKGROUND

Vehicle safety and efficiency are concerns for any vehicle operator. Safety is important for the operator of a vehicle, for the passengers in the vehicle, and for others that share the road with the vehicle. Safe vehicle operation also may reduce vehicle repair costs and downtime. Efficiency also is important for the vehicle operator and the vehicle owner. Efficient vehicle operation may reduce operating and maintenance costs associated with a vehicle, thereby improving profit margins for a business that operates vehicles. Components that contribute to both vehicle safety and efficiency include axle components and drive train components. Axle components include wheels, wheel hubs, pneumatic tires, suspension components, braking components, and the like. Drive train components include a vehicle engine and components that transfer power from the engine to the drive wheels of the vehicle.

Proper maintenance of the vehicle is important to safe and efficient operation of the vehicle. Proper maintenance includes proper lubricant fluid levels, proper replacement of fluids, proper tire pressures, and the like. In the case of a pneumatic tire, for example, improper air pressure in the tire can lead to an increased likelihood of a failure of the tire due to increased heating and/or increased or uneven tread wear. Improper air pressure can also increase costs associated with operating the vehicle due to reduced life of the tire, thereby increasing replacement costs and also increased rolling friction that reduces fuel economy of the vehicle and increases fuel costs.

Accordingly, an important aspect with respect to operating any vehicle is the proper maintenance of various components to ensure proper vehicle performance. In the case of an entity that operates a number of different vehicles, such as a trucking company, such maintenance is particularly important to ensure that costs associated with vehicle operation are not unnecessarily increased. However, in many cases, the volume of maintenance checks and the time required to perform such checks, coupled with shipping and delivery deadline pressures, results in such checks being performed less often than is ideal. Additionally, the value of maintenance checks to confirm proper vehicle conditions offset some of the benefits of properly maintained vehicles due to the costs associated with performing such checks. Furthermore, when a vehicle is on the road, access to a suitable maintenance facility may be limited.

Various systems have been designed and are the subject of numerous patents that accomplish the objective of tire pressure maintenance. These systems are typically called central tire inflation systems (CTIS). The most common systems in the heavy truck industry are designed for trailers. Trailer axles are typically hollow with axle ends that commonly have a through bore. The hollow axle provides an advantageous conduit to supply air pressure to the wheel end. The wheel end assembly includes a lubrication area between the axle and the wheel further defined by plugging the through bore in the axle end and covering the end of the axle with a hub cap attached to the wheel. The wheel is supported on the axle end by wheel bearings. The bearings require lubrication and the integrity of the lubrication area is essential in maintaining the operability and life of the wheel end assembly. In order to provide pressurized air to the rotating tires, the CTIS typically includes a rotary union in the same general location as the bearings and necessarily in or adjacent to the lubrication area between the stationary axle and the wheel.

Many tire inflation systems also provide an indication that air is flowing to one or more tires. Such an indication may provide notice to an operator that there is a leak in one or more tires, or perhaps a leak in the tire inflation system. In any event, the presence of such a leak is an indication that the vehicle should be serviced to correct the problem. Traditional systems commonly rely on very simplistic flow switches which use a differential pressure to close a mechanical switch. Furthermore, traditional systems require a wiring harness to be run back to the sensor from the indicator light, thus, adding to the installation costs. Many such systems only bring information to the nose of the trailer where a driver is required to notice a light in their mirror to know that a problem exists in the system, and also only warn when flow goes to any wheel but not a specific wheel in question.

Additionally, pressure regulation is provided in many tire inflation systems. Traditional pressure regulation systems generally rely on either mechanically controlled regulation or solenoid valve controlled regulation. The mechanically spring controlled regulators have poor temperature cycling repeatability, and also experience creep or rubber changes or time, which may have a detrimental influence on the output. Further, the output of such valves only opens based on a linear spring relationship. Some systems may use electronic regulators that are controlled through a complex set of solenoid poppet valves. Such systems have the advantage of allowing for non-linear output response, but generally have slow responses and wear out over time. Such systems traditionally do not have any wireless output capabilities or wireless control capabilities. Furthermore, such systems traditionally do not have flow sensors in the control loop to allow for additional nonlinear output control methods.

Tire pressure monitoring systems are available to sense, report, and optionally record the current status and pressure history of one or more tires. An example is the BatRF® system provided by Stemco LP of Longview, Tex. Various aspects of the present disclosure provide the ability to integrate a monitoring system into the maintenance system.

SUMMARY

Methods, systems, and devices are described for an integrated monitoring system and pressure maintenance system. Aspects of the present disclosure provide an electronic pressure regulator system that allows for a nonlinear output response similar to an electronic regulator. In some embodiments, a solid state MEMS proportional valve may be used to vary pressure behind a diaphragm in a method that provides relatively fast response time and may experience relatively little wear over a relatively large number of cycles. A single proportional valve may replace traditional two poppet solenoid valves of traditional systems, and controlling electronics with a single silicon chip may provide monitoring and control.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The system of the present disclosure, according to various embodiments, provides a pressure regulator for a central tire inflation system. The pressure regulator is a digital temperature compensated MEMS proportional valve piloted pressure regulator that may be operated in a fashion to provide enhanced pressure regulation to wheel ends in a central tire inflation system. In some aspects, an electronic pressure regulator system is provided that allows for a nonlinear output response. In some embodiments, a solid state MEMS proportional valve may be used to vary pressure behind a diaphragm in a method that provides relatively fast response time and may experience relatively little wear over a relatively large number of cycles. A single proportional valve may replace traditional two poppet solenoid valves of traditional systems, and controlling electronics with a single silicon chip may provide monitoring and control.

Figure 1:
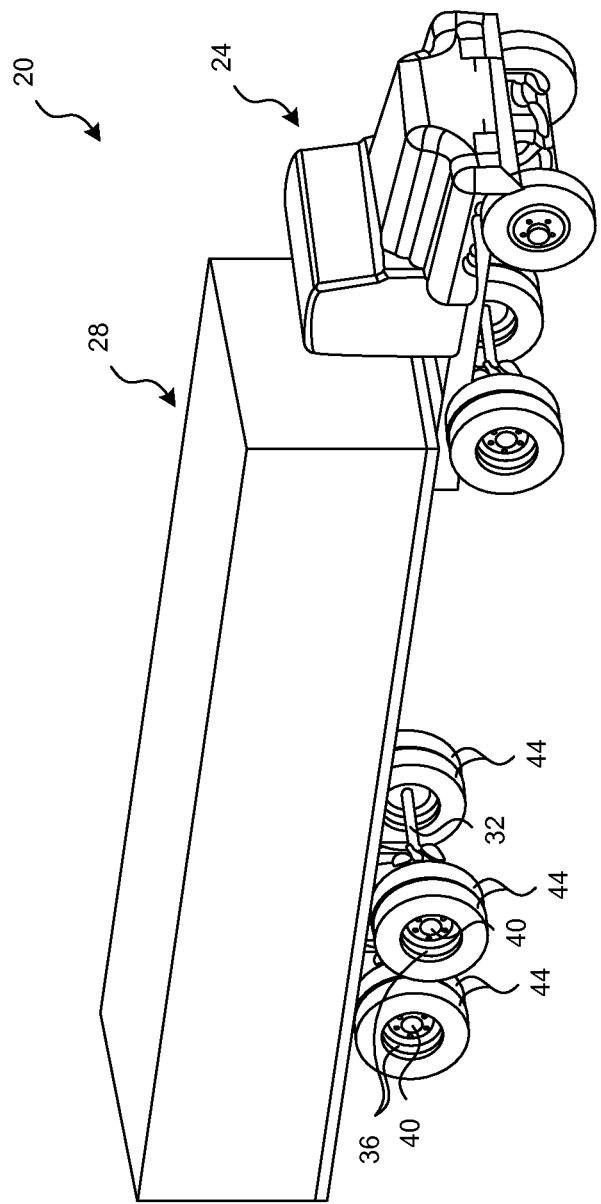
FIG. 1 is an application of an exemplary embodiment with respect to a heavy truck having a tractor and trailer.

With reference to FIG. 1, an application of an exemplary embodiment is described with respect to a heavy truck 20 having a tractor 24 and trailer 28. The trailer 28 is illustrated in FIG. 1 as a heavy duty trailer and, as is typical of such trailers, includes two axles 32, each of which having dual wheels 36 on each side. As will be readily apparent to one skilled in the art, trailer 28 could be a single axle trailer, and axles may have single versus dual wheels. The trailer 28 includes a pressure system that operates to maintain tires 44 within a preset pressure range. Each set of dual wheels 36, in this embodiment, includes a wheel end 40, that is interconnected with each pneumatic tire 44 on each set of dual wheels 36 and with a pressurized air source to provide pressurized air through the wheel end 40 to the tires 44. An exemplary pressurized air source with pressure regulator will be described in further detail for an embodiment with respect to FIGS. 2-4. The trailer 28 may include various sensors, such as sensors that monitor tire pressure, monitor the lubricant within wheel hubs, hobodometers that monitor the distance the vehicle has traveled, weight sensors, asset or vehicle identification sensors, and brake fluid sensors, to name a few. Furthermore, it will be understood that the devices, systems, and methods described herein are also applicable to applications other than heavy trucks, such as passenger vehicles, rail vehicles, marine vessels, aircraft, and any other application where air or fluid flow in a part of the vehicle is desired to be monitored.

Figure 2:
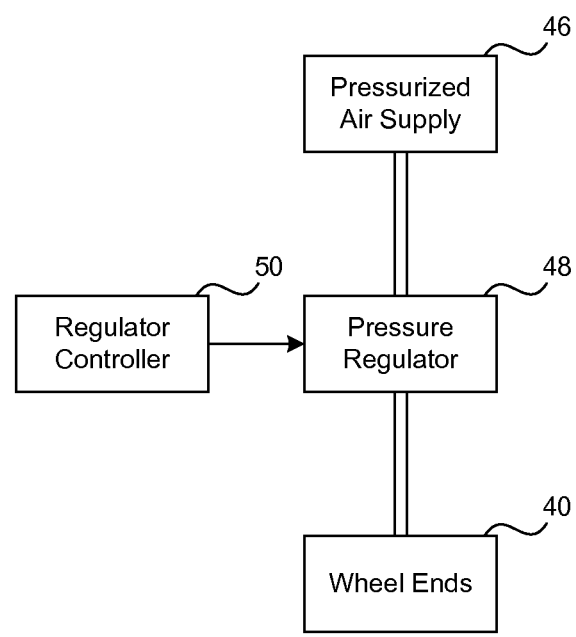
FIG. 2 is a block diagram illustrating an inflation system.

With reference now to FIG. 2, a block diagram illustration of an inflation system is discussed. In this embodiment, a pressurized air supply 46 provides pressurized air to wheel ends 40 through a pressure regulator 48. The pressurized air supply 46 may be any suitable supply of pressurized air, such as a tank reservoir of pressurized air and/or an air compressor associated with the vehicle. A regulator controller 50 controls operation of the pressure regulator 48. In some embodiments, the pressure regulator 48 is a digital temperature compensated MEMS proportional valve piloted pressure regulator. The regulator controller 50, according to some embodiments, may control operation of the pressure regulator 48 to provide for a nonlinear output response.

Figure 3:
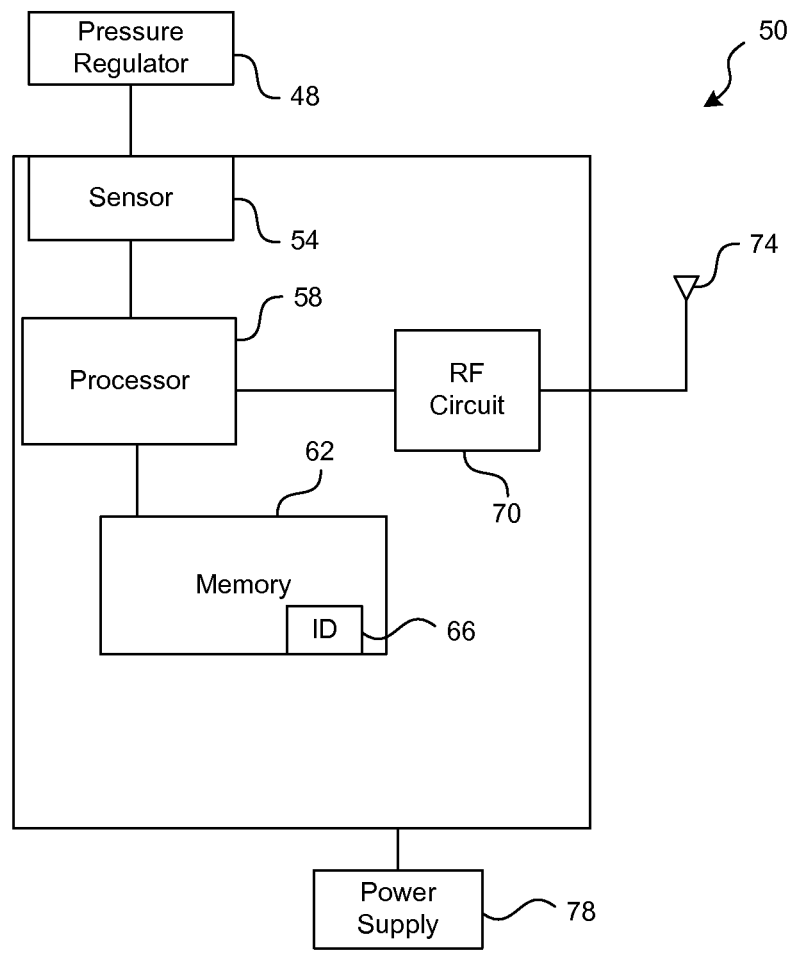
FIG. 3 is a block diagram illustrating a regulator controller of an embodiment.

With reference now to FIG. 3, a block diagram illustration of a regulator controller 50 of an embodiment is described. The controller 50 may include a sensor 54 that may be used to sense pressure and/or temperature, for use in controlling the pressure regulator 48. The pressure regulator 48 may be coupled to a tire pressure inflation system that provides compressed air to each wheel end. Processor 58 may provide control signals to the pressure regulator 48 to control the output of the pressure regulator 48. In some embodiments, memory 62 includes calibration information associated with the pressure regulator 48 and/or sensor 54. The pressure regulator 48 will be described in further detail below, with respect to FIG. 4. The processor 58 is interconnected with memory 62, that may include operating instructions for the processor 58, and information related to the regulator 48, such as high/low sensor output limits, information related to sensor calibration, and a unique identification 66. The processor 58, according to the embodiment of FIG. 3, is interconnected also with an RF circuit 70, that transmits and receives RF signals through antenna 74. It will be understood that other types of communications may be used to communicate with the controller 50. A power supply 78 provides power to each of the components of the controller 50. In one embodiment, the power supply 78 may be a battery that is included within a housing that houses the pressure regulator 48 and controller 50. The power supply 78 also may include a replaceable power source and/or rechargeable power source.

Figure 4:
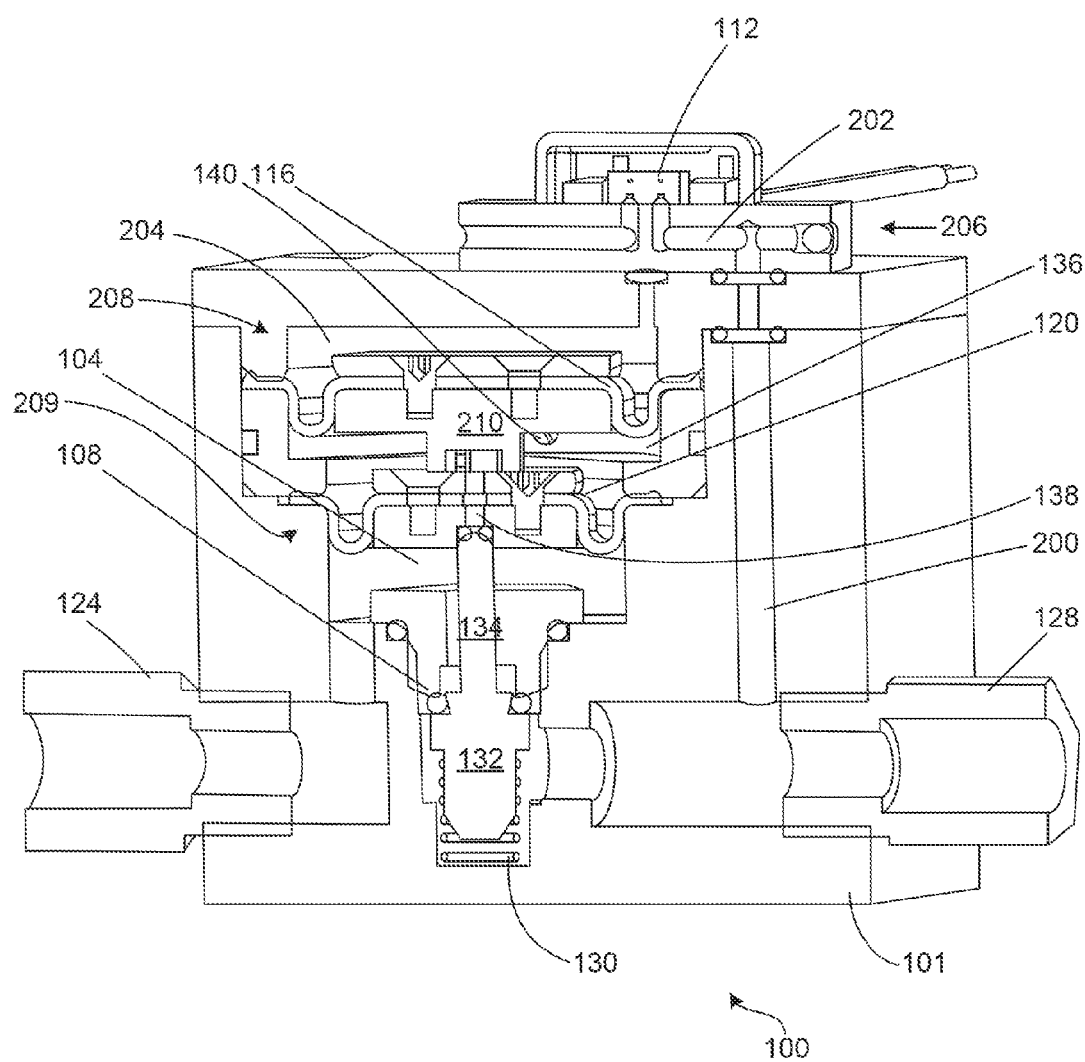
FIG. 4 is a pressure regulator according to an embodiment.

With reference now to FIG. 4, a pressure regulator 100 according to an embodiment is described. The pressure regulator 100 includes a housing 101 having an inlet 128, an outlet 124, and a mechanical regulation chamber 104. During operation to pressurize a pneumatic tire, air (or other gases) flows from the air supply 46 though inlet 128 into mechanical regulation chamber 104 and through outlet 124 to the pneumatic tire. During normal operation, however, the inlet is sealed from the mechanical regulation chamber 104 by a spring loaded seal 108; the spring loaded seal 108 has a recess to seal a rubber gasket, such as an O-ring. A means for controlling the flow of pressurized air is provided in the pressure regulator 100 as follows. The pressurized air at the inlet 128 is routed via tube 200 up to a proportional MEMS valve 112, which may be a pinch valve or the like. The MEMS valve 112 directs 100% of the pressurized air to tube 202 and into a top chamber 204 (sometimes referred to as a control chamber), 100% of the pressurized air to tube 206 that vents to atmospheric, or some ratio between 0 and 1 to direct some portion of the pressurized air to the top chamber 204 or atmospheric. In other words, the MEMS valve 112 controls an opening between the inlet pressure and ambient pressures to create a controlled pressure on the back of a top diaphragm 116. The top diaphragm, in this exemplary embodiment, is a convoluted diaphragm having a first surface area 208. A stand 210 operatively connects the top diaphragm 116 to a bottom diaphragm 120, which also is a convoluted diaphragm having a second surface area 209. The first surface area 208 is generally larger than the second surface area 209. The pressure in top chamber 204 provides a force against the top diaphragm 116 that is translated through stand 210 to the second diaphragm 120. Conversely, the outlet pressure in mechanical regulation chamber 104 provides a force against the bottom diaphragm 120 that acts against the force against the top diaphragm 116.

The spring loaded seal 108 comprises a spring 130 and a plunger 132 having a shaft 134. The spring 130 provides a force against the plunger 132 that is translated to the convoluted diaphragm through shaft 134 and acts in concert with the force against the bottom of diaphragm 120 provided by the pressure in the mechanical regulation chamber 104. When air pressure in the mechanical regulation chamber 104 drops below a first predetermined threshold, the force acting on the top diaphragm 116 overcomes the forces acting on the bottom diaphragm and opens the spring loaded seal 108 to allow for flow from the inlet 128 of the regulator to the outlet 124 of the regulator. During operation, as the output pressure rises, the pressure in the mechanical regulation chamber 104 increases the force on the lower diaphragm 120 until it balances out the force on the top diaphragm 116 causing the spring loaded rubber seal 108 to close again at a second predetermined threshold, which should correspond to the desired outlet pressure. If the outlet pressure becomes too high, the force of the pressure on the lower diaphragm 120 in the mechanical regulation chamber 104 overcomes the control pressure behind the top diaphragm 116 causing the lower diaphragm 120 to lift off the spring loaded seal 108 and to allow a leak path 138 through the center of the lower diaphragm 120 into the middle cavity 136 between the control 116 and lower 120 diaphragms. This middle cavity 136 has a vent 140 to atmospheric ambient pressures. When enough pressure has vented off, the control pressure in the upper chamber becomes greater than the outlet lower chamber pressure and the system reseals the vent. The outlet pressure and flow are constantly monitored by the controller so that the pressure in the control chamber can be monitored. As mechanical linkages change with temperature, the system can automatically compensate the control pressure to vary the response. The system can be controlled via a wireless interface, such as described with respect to FIG. 3, or it can report on its performance.

A MEMS proportional regulation valve, such as valve 100, may provide various advantages. Such a MEMS proportional valve acts as a pilot valve for a mechanical regulator, with no solenoid valves, thereby providing solid state operation leading to dramatic life improvements relative to electronic solenoid valves. The MEMS valve, according to various embodiments, provides a less expensive electronic regulator due to reduced part count. Such a valve may also provide for controlled pressure over wide temperature range and inlet pressure range. In some embodiments, the valve may be integrated with a flow meter in the feedback loop to provide nonlinear responsiveness. The valve may have an electronically controlled set point and may be programmable and communicate through RF, wired, or other types of wireless communications.

In some embodiments, flow information may be provided. In such embodiments, the valve may be used to create a venturi with an inlet port and an exit port and a pressure sensor on the inlet and exit ports. A pressure reading may be taken on the inlet and outlet ports and then using a table and interpolation algorithms, the controller may calculate the flow of the air flowing through the venturi. The controller may then, for example, broadcast this flow value over a wireless direct sequence spread spectrum wireless link to a light on the nose of the trailer or into a cab of the vehicle.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

I claim:

1. A central tire inflation system for use on a vehicle trailer, comprising:
    a pressurized gas source mounted on the vehicle trailer;
    a plurality of tires pressurized with gas mounted on the vehicle trailer;
    a pressure regulator pneumatically coupled with the pressurized gas source and each of the plurality of pneumatic tires, the pressure regulator comprising:
        a regulation chamber having an inlet coupled with the pressurized gas source and an outlet coupled with one or more of the plurality of tires;
        a proportional mico electro-mechanical (MEM) valve coupled to the pressurized air source such that a control chamber is in fluid communication with the pressurized air source, wherein the proportional MEM valve comprises a pinch valve; and
        a controller coupled with the pressure regulator and configured to control the proportional MEM valve to control the fluid communication between the control chamber and the pressurized air source,
        wherein the inlet is sealed off from the regulation chamber by a normally closed valve between the inlet and the regulation chamber, and the proportional MEM valve controls the fluid communication between the control chamber and the pressurized air source to create a controlled pressure in the control chamber, and wherein an increased output pressure increases pressure in the regulation chamber to allow the normally closed valve to close at a first predetermined outlet pressure.

2. The central tire inflation system of claim 1, the valve comprises a spring loaded valve.

3. The central tire inflation system of claim 1, wherein the normally closed valve opens at a second predetermined outlet pressure lower than the first predetermined outlet pressure.

4. The central tire inflation system of claim 1, wherein the proportional MEM valve controls fluid communication between the control chamber, the pressurized gas source, and ambient such that the ratio of air flow to the control chamber to air flow to atmospheric is between 0 to 1.

5. The central tire inflation system of claim 1, wherein the control chamber is formed in part by a first diaphragm and the regulation chamber is formed in part by a second diaphragm, and further comprising:
a cavity between the first and second diaphragms,
a stand in the cavity operatively coupling the first and second diaphragms, and a vent maintaining the cavity at atmospheric pressure.

6. The central tire inflation system of claim 5, wherein the valve further comprises:
a spring; and
a plunger having a shaft wherein the shaft is operatively coupled to the second diaphragm such that at least a portion of the spring force is translated through the shaft to the second diaphragm.

7. The central tire inflation system of claim 5 wherein the first diaphragm has a first surface area and the second diaphragm has a second surface area smaller than the first surface area.

8. A central tire inflation system for use on a vehicle wherein the vehicle comprises a pressurized gas source and a plurality of tires pressurized with gas mounted to the vehicle and selectively placed in fluid communication with the pressurized gas source by a pressure regulator, the pressure regulator comprising:
a control chamber configured to be pressurized to a control pressure;
a regulation chamber;
an inlet configured to be in fluid communication with the pressurized gas source; and
an outlet configured to be in fluid communication with at least one of the plurality of pneumatic tires and the regulation chamber such that the regulation chamber is pressurized to an outlet pressure;
a micro electro-mechanical valve, the micro electro-mechanical valve placing the control chamber, atmosphere, or a combination thereof in fluid communication with the inlet wherein a ratio of gas flow to the control chamber and total gas flow is between 0 and 1 to regulate the control pressure in the control chamber;
a cavity having a vent configured to be in fluid communication with the atmosphere; and
a flow valve interposed between the inlet and the regulation chamber and operable to be selectively opened and closed,
wherein the control chamber is operably coupled to the flow valve such that the flow valve opens when the outlet pressure is less than or equal to a first predetermined outlet pressure, and wherein the vent is placed in fluid communication with the regulation chamber when the outlet pressure is greater than or equal to a second predetermined outlet pressure.

9. The pressure regulator of claim 8 wherein the control chamber comprises a first diaphragm and the regulation chamber comprises a second diaphragm that are operably coupled by a stand.

10. The pressure regulator of claim 9 wherein when the outlet pressure is less than or equal to a first predetermined outlet pressure, the first diaphragm moves the second diaphragm, and the second diaphragm opens the flow valve.

11. The pressure regulator of claim 10 wherein when the outlet pressure is greater than or equal to a second predetermined outlet pressure, the second diaphragm moves the first diaphragm and closes the flow valve.

12. The pressure regulator of claim 11 wherein the flow valve comprises a spring and a plunger and the plunger abuts the second diaphragm such that movement of the second diaphragm causes the plunger to move with or against the spring to close or open the flow valve.

13. The pressure regulator of claim 9 wherein the stand resides in a cavity located between the control chamber and the regulation chamber, wherein the cavity contains a port to atmosphere.

14. The pressure regulator of claim 9 wherein the first diaphragm has a first surface area and the second diaphragm has a second surface area less than the first surface area.

15. The pressure regulator of claim 8 wherein the micro electro-mechanical valve changes the ratio of gas flow to the control chamber to total gas flow to maintain the control pressure in the control chamber based on a control signal from a controller.

16. The pressure regulator of claim 15 wherein the controller is wirelessly coupled to the micro electro-mechanical valve.

17. A method of maintaining the pressure of at least one pneumatic tire on a vehicle comprising:
providing a source of pressurized gas to a pressure regulator, wherein the pressure regulator comprises a control chamber, a regulation chamber, and a flow valve;
providing a proportional micro electro-mechanical (MEM) valve in fluid communication with the source of pressurized gas, the control chamber, and atmosphere;
controlling a flow rate of the pressurized gas from the source to both the control chamber and atmosphere using the proportional MEM valve such that flow of the pressurized gas from the source to the control chamber is between 0% and 100% and the remainder of the flow of the pressurized gas is to the atmosphere;
placing the regulation chamber of the pressure regulator in fluid communication with at least one pneumatic tire;
opening the flow valve when a pressure in the regulation chamber is sufficiently below the pressure in the control chamber to indicate that the at least one pneumatic tire requires inflation; and
closing the flow valve when the pressure in the regulation chamber is above the pressure indicating that the at least one pneumatic tire requires inflation.

18. The method of claim 17 further comprising:
venting the regulation chamber when the pressure in the regulation chamber is at or above a maximum pressure.

* * * * *